United States Patent
Koo et al.

(10) Patent No.: US 8,064,383 B2
(45) Date of Patent: Nov. 22, 2011

(54) METHOD FOR REQUESTING RADIO RESOURCES FOR UPLINK PACKET TRANSMISSION IN GPRS SYSTEM

(75) Inventors: Hyounhee Koo, Anyang-si (KR); Sang Rok Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 941 days.

(21) Appl. No.: 11/844,288

(22) Filed: Aug. 23, 2007

(65) Prior Publication Data

US 2008/0049671 A1 Feb. 28, 2008

(30) Foreign Application Priority Data

Aug. 23, 2006 (KR) .................. 10-2006-0079749

(51) Int. Cl.
*H04W 4/00* (2009.01)
(52) U.S. Cl. ......... 370/328; 370/329; 370/338; 455/450
(58) Field of Classification Search .................. None
See application file for complete search history.

(56) References Cited

U.S. PATENT DOCUMENTS

| | | | |
|---|---|---|---|
| 6,118,997 A * | 9/2000 | Kim et al. .................. 455/424 |
| 6,181,683 B1 | 1/2001 | Chevillat et al. | |
| 6,804,212 B1 * | 10/2004 | Vallstrom et al. ............. 370/331 |
| 2002/0141359 A1 * | 10/2002 | Jei .................................. 370/329 |
| 2003/0064728 A1 | 4/2003 | Speight | |
| 2003/0076812 A1 * | 4/2003 | Benedittis ..................... 370/350 |
| 2004/0081132 A1 * | 4/2004 | Toniatti et al. ................ 370/345 |
| 2004/0176093 A1 * | 9/2004 | Raval et al. ................... 455/436 |
| 2004/0192313 A1 * | 9/2004 | Otting ........................... 455/446 |
| 2007/0237163 A1 * | 10/2007 | Kadambi et al. ............. 370/401 |
| 2009/0073890 A1 * | 3/2009 | Sundberg ...................... 370/252 |
| 2009/0219909 A1 * | 9/2009 | Ko et al. ........................ 370/343 |
| 2009/0232059 A1 * | 9/2009 | Sundberg et al. ............. 370/329 |

OTHER PUBLICATIONS

3rd Generation Partnership Project (3GPP), "Technical Specification Group GSM/EDGE Radio Access Network General Packet Radio Service (GPRS); Mobile Station (MS)—Base Station System (BSS) interface; Radio Link Control/Medium Access Control (RLC/MAC) protocol (Release 1999)," 3GPP TS 04.60 V8.27.0, Sep. 2005.

* cited by examiner

*Primary Examiner* — Anthony Sol
(74) *Attorney, Agent, or Firm* — Lee, Hong, Degerman, Kang & Waimey (57) ABSTRACT

A method of enabling a mobile station (MS) to request radio resources for uplink packet transmission is provided. The method includes starting a supervision timer at the beginning of a packet access procedure, the packet access procedure initiated by scheduling the sending of a packet channel request message and performing cell re-selection when the supervision timer expires, wherein the supervision timer is stopped when any message is received from a network in response to the packet channel request message or after M+1 ($M \geq 0$) attempts to send the packet channel request message.

8 Claims, 8 Drawing Sheets

METHOD FOR REQUESTING RADIO RESOURCES FOR UPLINK PACKET TRANSMISSION IN GPRS SYSTEM

CROSS-REFERENCE TO RELATED APPLICATIONS

This application claims the benefit of priority of a Korean Patent Application Serial No. 10-2006-0079749, filed on Aug. 23, 2006, which is incorporated by reference in its entirety herein.

BACKGROUND

1. Technical Field

The present invention relates to a wireless communication, and more particularly, to a method of requesting radio resources for uplink packet transmission in wireless communication system.

2. Related Art

The GSM (Global System for Mobile communication) is a radio technology which has been developed as a system for standardizing radio communication systems in Europe and which has widely been deployed all over the world. The GPRS (General Packet Radio Service) is introduced to provide a packet switched data service in a circuit switched data service provided from the GSM. The EDGE (Enhanced Data Rate for GSM Evolution) employs the 8-PSK (Phase Shift Keying) instead of the GMSK (Gaussian Minimum Shift Keying) employed in the GSM. The EGPRS (Enhanced General Packet Radio Service) represents the GPRS using the EDGE.

In general, a downlink means a communication from a base station (BS) to a mobile station (MS) and an uplink means a communication from the MS to the BS.

In order for the MS to transmit packet data in the uplink, uplink radio resources should be assigned to the MS from the BS. In order to request the uplink radio resources, the MS firstly transmits a packet channel request message to the BSS. A series of processes of allowing the BS to assign radio resources to the MS is called a packet access procedure. While waiting for a response to the packet channel request message, the MS should monitor the entire PCCCH (Packet Common Control Channel) corresponding to its PCCCH_GROUP. Each PCCCH carries its own PCCCH_GROUP of the MSs. The MS in a specific PCCCH_GROUP listens for the response to the channel request message over the specific PCCCH to which the PCCCH_GROUP belongs, as described in 3GPP TS 05.02 V7.7.0 (2001-08), "Radio Access Network; Multiplexing and multiple access on the radio path", section 6.5.6.

The BS (or network) may not respond to the packet channel request message from the MS. That is, the MS may not receive any response to the packet channel request message. This is called a random access failure. The random access failure results from various reasons such as a reason that the BS cannot receive the packet channel request message.

When there is such an error that the random access failure occurs in the course of performing the packet access procedure to assign the uplink radio resources, it is important by what method such an error should be processed. Since the error in the packet access procedure can always occur, an efficient method for processing such an error should be prepared. Otherwise, the assignment of the uplink radio resources may be delayed, thereby deteriorating the quality of the wireless communication system.

SUMMARY

The present invention provides a method of processing failure during a packet access procedure.

In one aspect, a method of enabling a mobile station (MS) to request radio resources for uplink packet transmission is provided. The method includes starting a supervision timer at the beginning of a packet access procedure, the packet access procedure initiated by scheduling the sending of a packet channel request message and performing cell re-selection when the supervision timer expires, wherein the supervision timer is stopped when any message is received from a network in response to the packet channel request message or after M+1 (M≧0) attempts to send the packet channel request message.

In another aspect, a method of performing a packet access procedure in a general packet radio service (GPRS) system is provided. The packet access procedure for establishing a temporary block flow (TBF) to support the transmission of uplink packet data. The method includes starting a supervision timer by transmitting a packet channel request message, the packet channel request message including an indication of a mobile station's demand of radio resources and performing cell re-selection when the supervision timer expires, wherein the supervision timer is stopped when any message is received from a network in response to the packet channel request message or after at least one attempt to send the packet channel request message.

In still another aspect, a mobile station (MS) in a general packet radio service (GPRS) system is provided. The MS includes a transceiver configured to transmit a packet channel request message to request radio resources for uplink packet transmission, a supervision timer configured to supervise the request of radio resources, wherein the supervision timer is started by transmitting the packet channel request message and the supervision timer is stopped when any message is received from a network in response to the packet channel request message or after M+1 (M≧0) attempt to send the packet channel request message and a controller configured to perform cell re-selection when the supervision timer expires.

DESCRIPTION OF THE EXEMPLARY EMBODIMENTS

Figure 1:
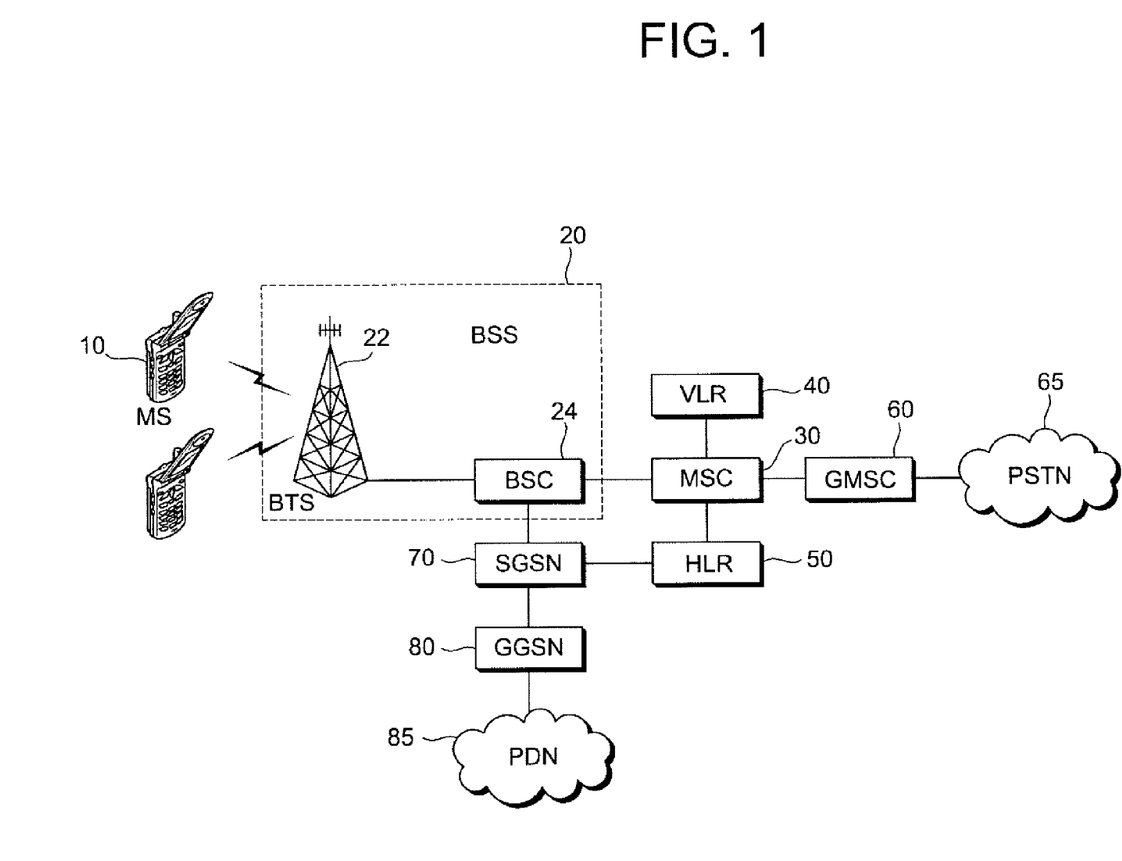
FIG. 1 is a block diagram illustrating a radio communication system.

FIG. 1 is a block diagram illustrating a wireless communication system, which shows a network based on the GSM (Global System for Mobile communication)/GPRS (General Packet Radio Service). The wireless communication systems are widely used to provide a variety of communication services of voice, packet data, and so on.

Referring to FIG. 1, a mobile station (MS) 10 means a communication instrument carried by a user and may be called other terms such as UE (User Equipment), UT (User Terminal), SS (Subscriber Station), and wireless device.

A base station subsystem (BSS) 20 includes a base transceiver station (BTS) 22 and a base station controller (BSC) 24. The BTS 22 communicates with the MS 10 in a cellular area through a radio interface and a synchronization function with the MS 10. The BSC 24 interfaces at least one BTS 22 with a mobile switching center (MSC) 30. The BSS 20 may be called as a base station, Node-B, and access point.

The MSC 30 connects the BSS 20 to a different kind of network such as the PSTN (Public Switching Telephone Network) 65 or the PLMN (Public Land Mobile Network) through the GMSC (Gateway MSC) 60. A VLR (Visitor Location Register) 40 stores temporary user data, which includes information on the roaming of all the MSs 10 in a service area of the MSC 30. An HLR (Home Location Register) 50 includes information on all the subscribers in the home networks. An SGSN (Serving GPRS Support Node) 70 takes charge of mobility management of the subscribers. A GGSN (Gateway GPRS Data Network) 80 routs a packet at the current position of the MS 10 to interface the MS with an external packet data network such as PDN (Public Data Network) 85.

A temporary block flow (TBF) is a logical connection offered by two Medium Access Control (MAC) entities so as to support the unidirectional transfer of Radio Link Control (RLC) Protocol Data Unit (PDU) on basic physical subchannels. The TBF is not provided in a packet idle mode. In the packet idle mode, any radio resource on a packet data physical channel is not assigned to the MS. At least one TBF is provided in a packet transfer mode. In the packet transfer mode, radio resources on one or more packet data physical channels for the transfer of packet data are assigned to the MS. The MAC-idle state means a MAC-control-entity state where no basic physical subchannel is assigned. A Temporary Flow Identity (TFI) is assigned to each TBF by the network. The MS assumes that the TFI value is unique among concurrent TBFs in the same direction (uplink or downlink) on all Packet Data Channels (PDCHs) used for the TBFs. The same TFI value may be used concurrently for TBFs on other PDCHs in the same direction and for TBFs in the opposite direction.

Figure 2:
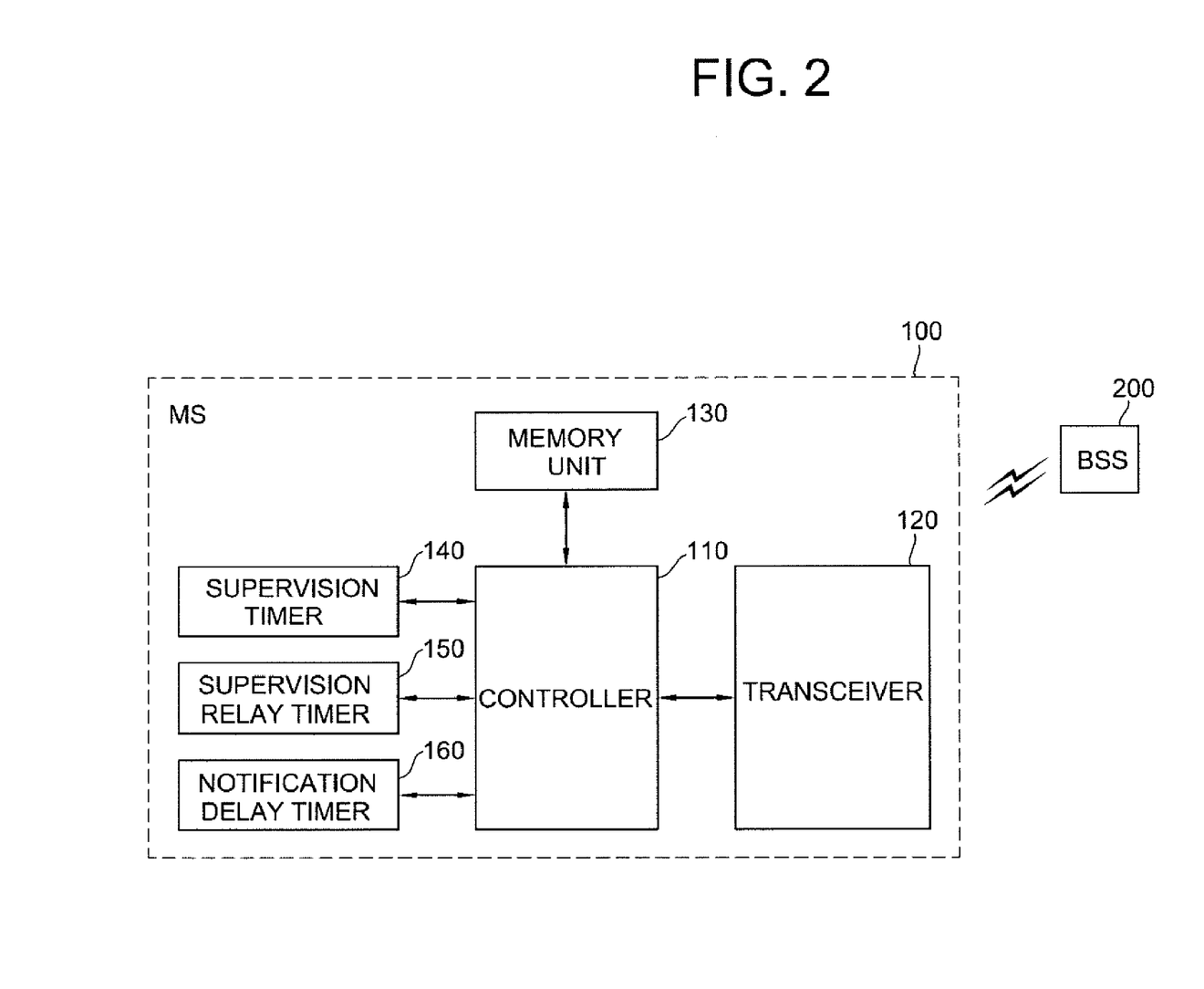
FIG. 2 is a block diagram illustrating a mobile station according to an embodiment of the invention.

FIG. 2 is a block diagram illustrating a MS according to an embodiment of the invention.

Referring to FIG. 2, the MS 100 includes a controller 110, a transceiver 120 and a supervision timer 140.

The transceiver 120 receives a variety of messages from the controller 110, converts the received messages into analog signals and transmits the analog signals to the BSS. The transceiver 120 receives a variety of messages from the BSS 200 and sends the received messages to the controller 110.

The controller 110 controls the entire operations of the MS 100 to establish the communication with the BSS 200 and transmits and receives data to and from the BSS to provide the data to the user. The controller 110 performs a packet access procedure or a cell re-selecting process to be described later.

The memory unit 130 stores the number of times when the MS 100 transmits a packet channel request message to the base station subsystem for the purpose of establishing the uplink and stores the maximum number of times (M) for re-transmitting the packet channel request message. The maximum number of times for re-transmission (M) can be received from the BSS 200. When not receiving any response message from the BSS even after transmitting the packet channel request message by the maximum number of times for re-transmission, the supervision timer 140 is aborted and the supervision relay timer 150 is started.

The supervision timer 140 is used to supervise the packet access procedure. The supervision timer 140 defines the maximum allowable time when the MS 100 repeats the transmission of the packet channel request message. When the maximum allowable time passes, the supervision timer 140 expires. The maximum allowable time can be set to, for example, 5 seconds but is not particularly limited. The maximum allowable time can be set variously depending on the systems.

The supervision timer 140 is started at the time of initiating the packet access procedure. The supervision timer 140 expires when not receiving any message from the base station subsystem until the maximum allowable time passes. When the supervision timer 140 expires, the packet access procedure is aborted and a random access failure is notified to an upper layer. The random access failure refers to the access case when the MS does not get any response to its packet channel request message from the network. When the random access failure occurs, the MS autonomously performs the cell re-selecting process. The supervision timer 140 is stopped when receiving any response to the packet channel request message from the network or transmitting the packet channel request message by the maximum number of transmission times (M+1).

The MS 100 may further include a supervision relay timer 150 and a notification delay timer 160. In the following description, the supervision timer 140, the supervision relay timer 150 and the notification delay timer 160 may be called, a first timer, a second timer and a third timer, respectively.

The supervision relay timer 150 is started at the time of repeatedly transmitting the packet channel request message by M+1 times (where M≧0) or receiving a packet access reject message. The supervision relay timer 150 is stopped when receiving a packet uplink assignment message or receiving a packet queuing notification message. The supervision relay timer 150 expires when the set time passes. When the supervision relay timer 150 expires, the packet access procedure is aborted. When the supervision relay timer 150 expires after transmitting the channel request message by the M+1 times, the MS can notify the random access failure to the upper layer and can perform a cell re-selection process. When the supervision relay timer 150 expires after receiving the packet access reject message, the MS can notify the packet access failure to the upper layer and return to an idle mode.

The notification delay timer 160 is started after the packet queuing notification message is received from the network. The notification delay timer 160 is stopped when receiving the packet uplink assignment message. When a predetermined time passes, the notification delay timer 160 expires. The predetermined time may be, for example, 5 seconds. When the notification delay timer 160 expires, the packet access procedure is stopped. When the notification delay timer 160 expires, the MS can notify the access failure to the upper layer and return to an idle mode.

A method of establishing uplink radio resources will be described now. The following method may be called as a packet access procedure in the GPRS/EGPRS system. The packet access procedure serves to establish at least one TBF for supporting the transmission of packet data in the uplink. The packet access failure means an access case where the access to the network is explicitly denied the MS, i.e. the MS is not allowed to transmit the packet channel request message.

The random access failure means an access case where the MS does not get any response to its packet channel request message from the network. The idle mode may be a packet idle mode or a medium access control (MAC) idle state.

Figure 3:
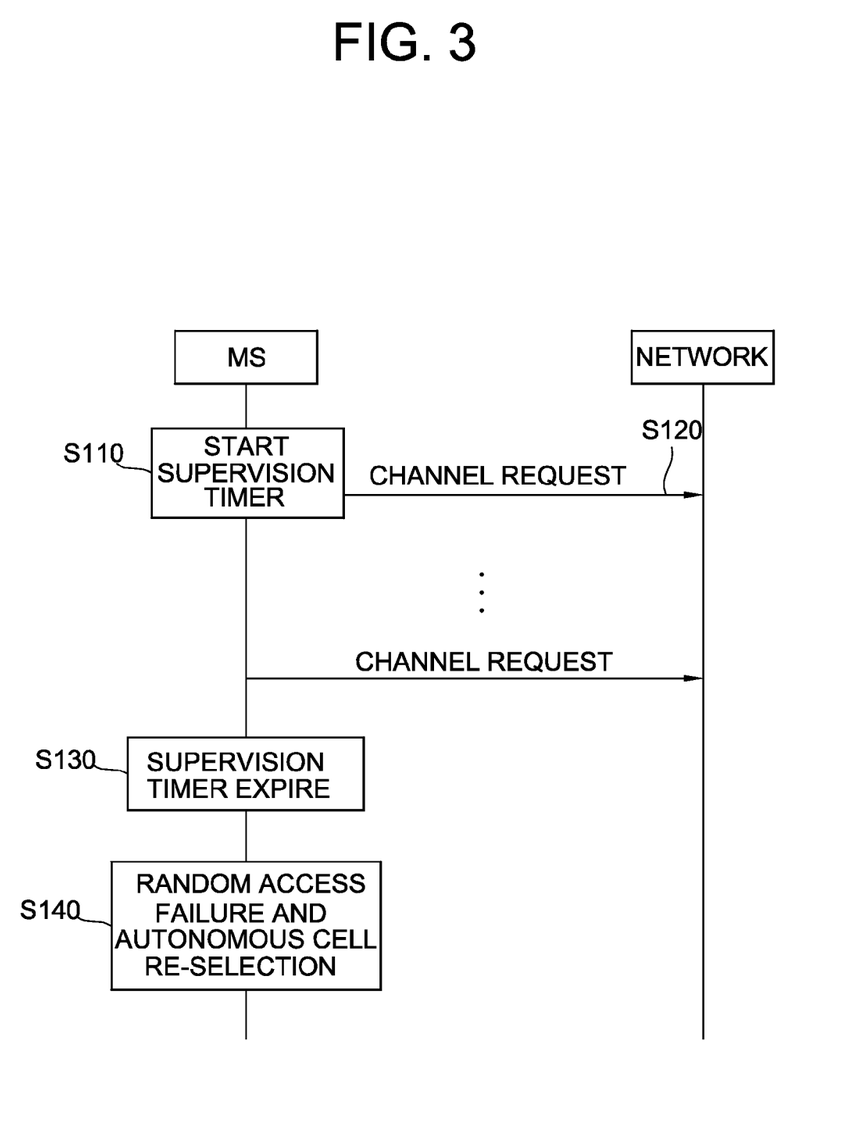
FIG. 3 is a flowchart illustrating a packet access process according to an embodiment of the invention.

FIG. 3 is a flowchart illustrating a packet access procedure according to an embodiment of the invention.

Referring to FIG. 3, a MS starts a supervision timer at the time of initiating the packet access procedure (S110). The MS initiates the packet access procedure by scheduling the sending of a packet channel request message through a packet random access channel (PRACH) (S120). The packet channel request message is sent through the PRACH and contains an indication of the type of access and parameters required to indicate the MS's demand for radio resources. The packet channel request message can be repeatedly transmitted up to M+1 times. The value of M means the maximum number of re-transmission times, which can be notified to the MS from a network. While waiting for a response to the packet channel request message, the MS monitors the full PCCCH corresponding to its PCCCH_GROUP. The MS can perform a signal strength measuring operation as it is defined for the packet idle mode.

When not receiving any message from the network until the predetermined time passes, the supervision timer expires (S130).

When the supervision timer expires, the MS notifies the upper layer of a random access failure and performs a cell re-selection (S140). The cell re-selection is that the MS try to select a different cell while the MS camped on a cell (current serving cell). The MS has no prior knowledge about the different cell. The MS searches at least the number of the strongest radio frequency (RF) channels in a descending order of received signal levels. The MS performs the cell re-selection by checking cells in the descending order of the received signal strengths.

When not receiving any response message from the network, the supervision timer expires. When not receiving any response message from the network, the cell to which the MS currently belongs may not be proper. Accordingly, when the supervision timer expires, the MS selects a proper cell by performing the cell re-selection.

Figure 4:
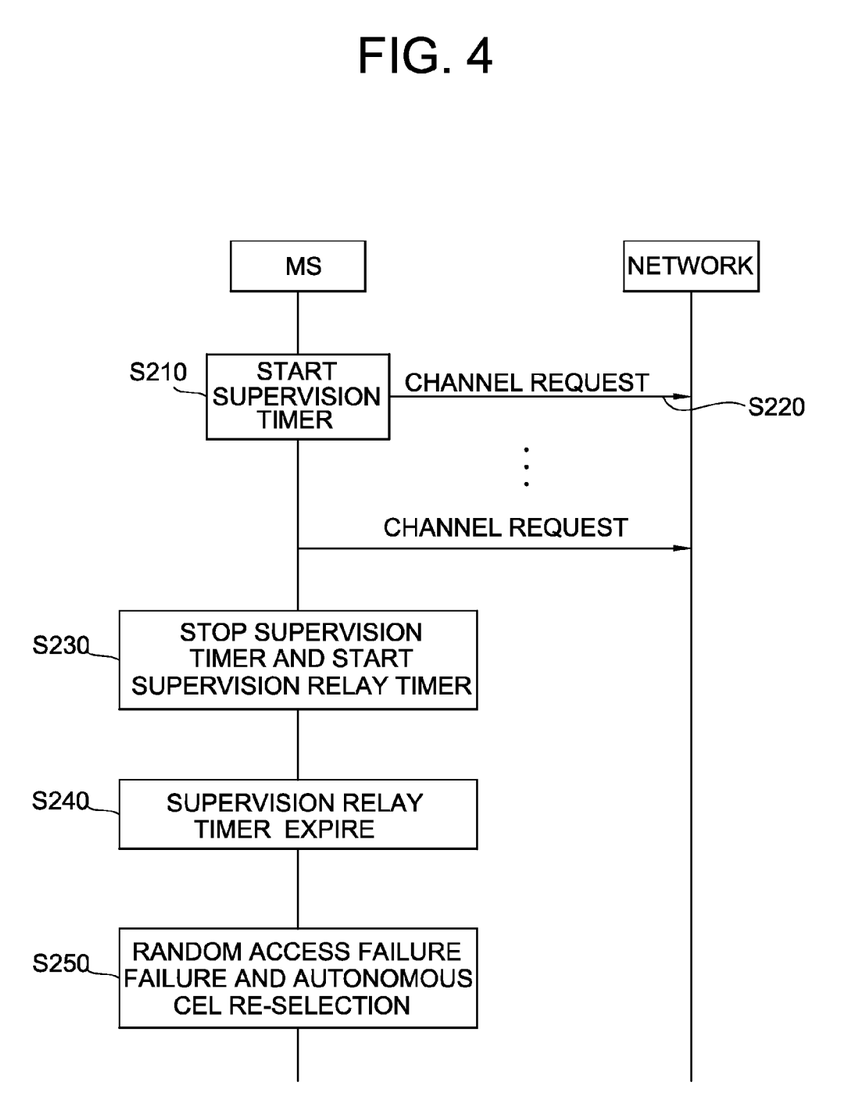
FIG. 4 is a flowchart illustrating a packet access process according to another embodiment of the invention.

FIG. 4 is a flowchart illustrating a packet access procedure according to another embodiment of the invention.

Referring to FIG. 4, a MS initiates a supervision timer at the time of initiating the packet access procedure (S210). The MS initiates the packet access procedure by scheduling the sending of a packet channel request message through a packet random access channel (PRACH) (S220). The packet channel request message can be repeatedly transmitted by M+1 times.

When the packet channel request message is repeatedly transmitted by M+1 times, the supervision timer is stopped and a supervision relay timer is started (S230). When the packet channel request message is repeatedly transmitted by M+1 times before the supervision timer expires, the supervision relay timer is started.

When not receiving a packet uplink assignment message or a packet queuing notification message from a network until a predetermined time passes, the supervision relay timer expires (S240). The packet uplink assignment message is used to assign one TBF. The network having received the packet channel request message assigns radio resources and notifies the MS of the assigned radio resources by the use of the packet uplink assignment message. The packet queuing notification message is sent through the same PCCCH through which the network has received the packet channel request message. The packet queuing notification message contains a temporary queuing identity which is later used to identify the MS.

When the supervision relay timer expires, the MS notifies the upper layer of a random access failure and performs the cell re-selection (S250).

When the packet channel request message is transmitted M+1 times before the supervision timer expires, the supervision timer is stopped and the supervision relay timer is started. When the supervision relay timer expires, the MS considers the current state as the random access failure and tries to re-select a new cell.

Figure 5:
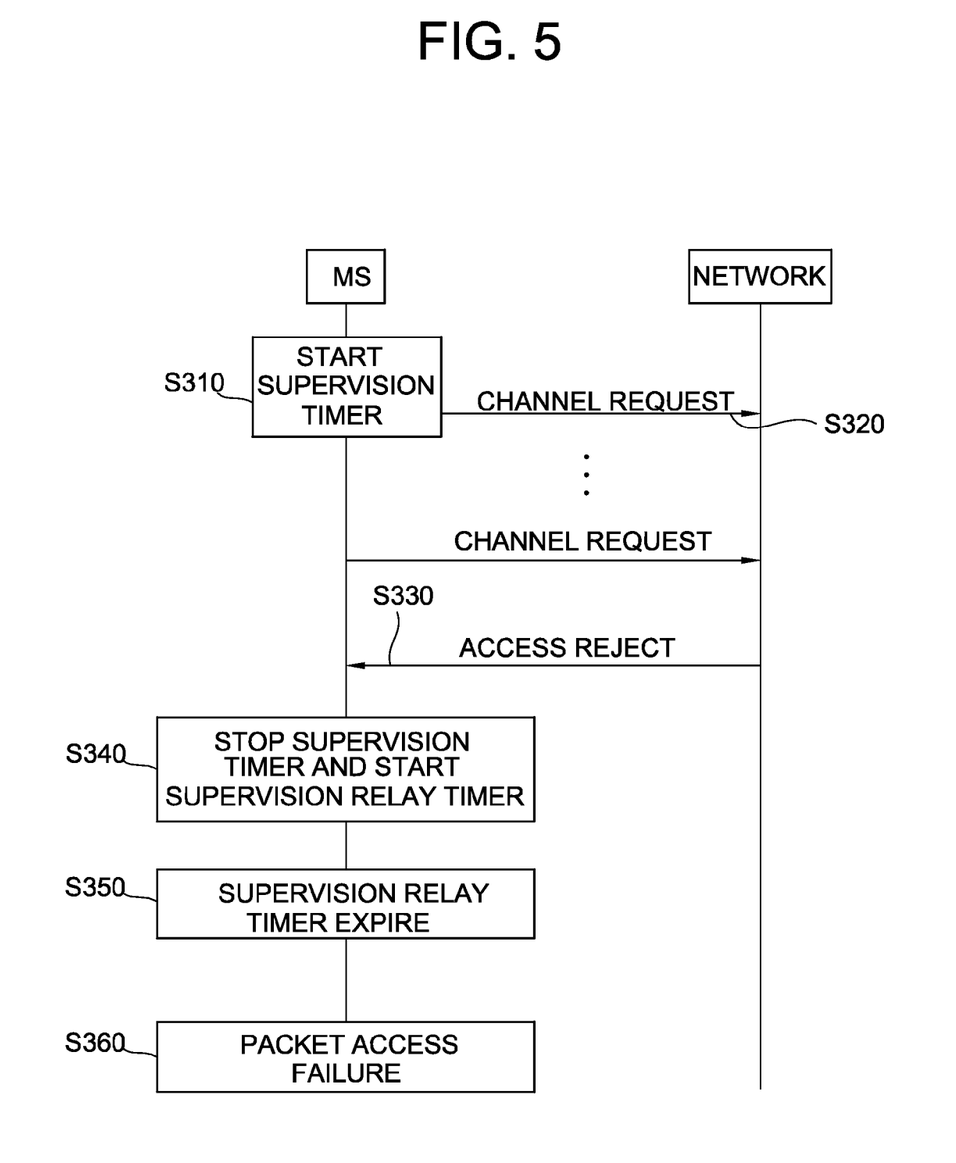
FIG. 5 is a flowchart illustrating a packet access process according to still another embodiment of the invention.

FIG. 5 is a flowchart illustrating a packet access procedure according to another embodiment of the invention.

Referring to FIG. 5, a MS starts a supervision timer at the time of initiating the packet access procedure (S310). The MS initiates the packet access procedure by scheduling the sending of a packet channel request message through a packet random access channel (PRACH) (S320).

A network can transmit a packet access reject message in response to the channel request message from the MS (S330). The packet channel reject message indicates that the network rejects the uplink radio resource request from the MS.

When receiving the packet channel reject message from the network, the supervision timer is stopped and a supervision relay timer is started (S340).

When not receiving a packet uplink assignment message or a packet queuing notification message from the network until a predetermined time passes, the supervision relay timer expires (S350).

When the supervision relay timer expires, the MS notifies the upper layer of a packet access failure and returns to a packet idle mode or a MAC idle state (S360). The MS leaves the packet idle mode at the time of initiating the packet access procedure. When the packet access is failed, the MS returns to the packet idle mode.

If the packet channel reject message is received, it means that the request for radio resources is explicitly rejected by the network. Accordingly, this situation is treated as the packet access failure, but not the random access failure.

Figure 6:
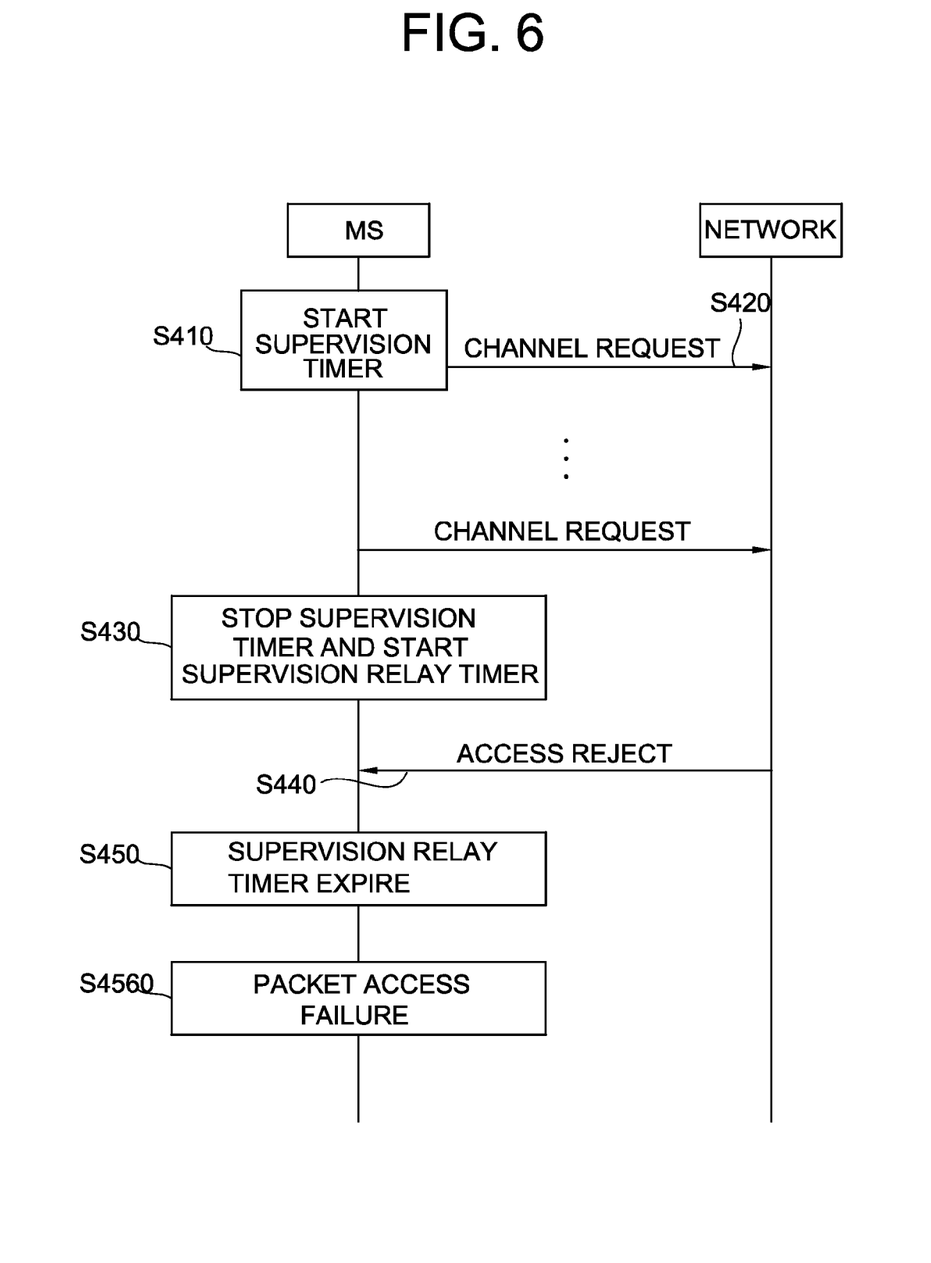
FIG. 6 is a flowchart illustrating a packet access process according to still another embodiment of the invention.

FIG. 6 is a flowchart illustrating a packet access procedure according to another embodiment of the invention.

Referring to FIG. 6, a MS starts a supervision timer at the time of initiating the packet access procedure (S410). The MS initiates the packet access procedure by scheduling the sending of a packet channel request message through a packet random access channel (PRACH) (S420). The packet channel request message can be repeatedly transmitted up to M+1 times.

When the packet channel request message is repeatedly transmitted M+1 times, the supervision timer is stopped and a supervision relay timer is started (S430).

A network transmits the packet channel reject message in response to the packet channel request message from the MS (S440), after the supervision relay timer is started.

The packet channel reject message is ignored and the supervision relay timer expires (S450) when not receiving a packet uplink assignment message or a packet queuing notification message from the network until a predetermined time passes.

When the supervision relay timer expires, the MS notifies the upper layer of a packet access failure and can return to a packet idle mode or a MAC idle state (S460).

If the packet channel reject message is received after the supervision relay timer is started, it means that the request for radio resources is explicitly rejected by the network. Accordingly, this case is treated as the packet access failure.

Figure 7:
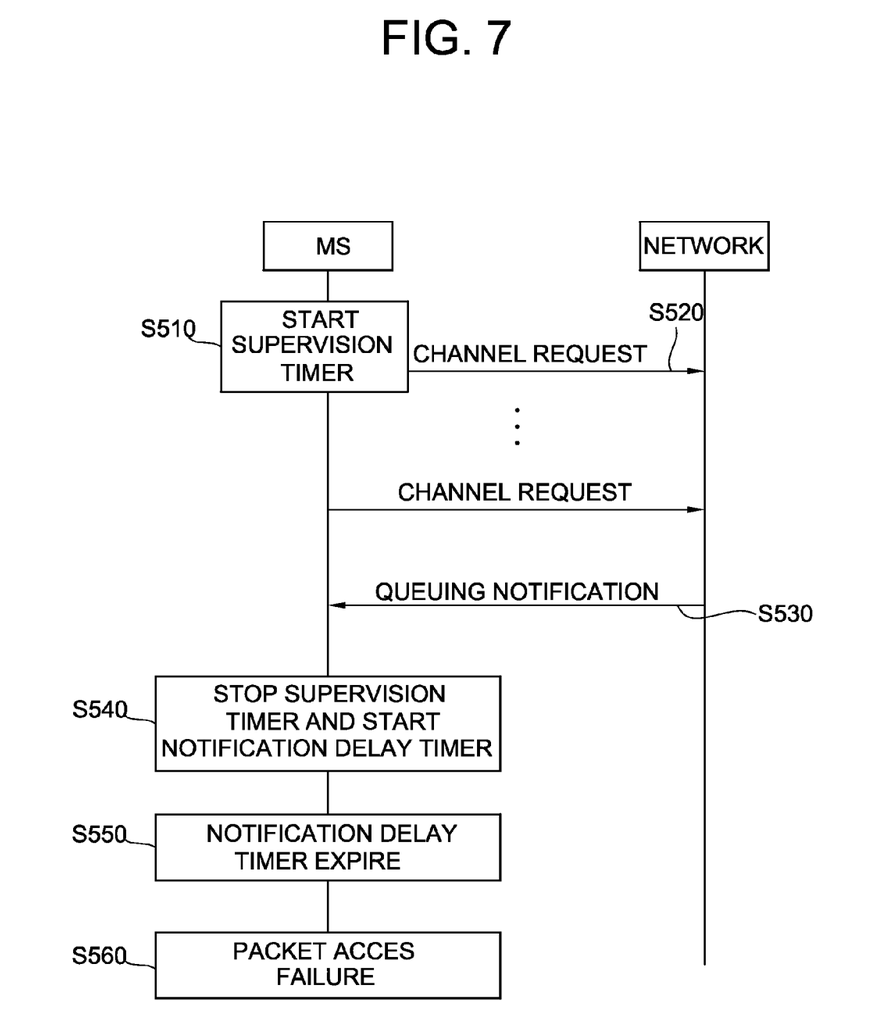
FIG. 7 is a flowchart illustrating a packet access process according to still another embodiment of the invention.

FIG. 7 is a flowchart illustrating a packet access procedure according to another embodiment of the invention.

Referring to FIG. 7, a MS starts a supervision timer at the time of initiating the packet access procedure (S510). The MS initiates the packet access procedure by scheduling the sending of a packet channel request message through a packet random access channel (PRACH) (S520). The packet channel request message can be repeatedly transmitted M+1 times.

A network can transmit a packet queuing notification message in response to the packet cannel request message (S530).

When the packet queuing notification message is received from the network, the supervision timer is stopped and a notification delay timer is started (S540).

When the packet uplink assignment message is not received from the network until a predetermined time passes, the notification delay timer expires (S550).

When the notification delay timer expires, the MS notifies the upper layer of a packet access failure and returns to a packet idle mode or a MAC idle state (S560).

If the packet queuing notification message is received, it means that the request for radio resources is explicitly rejected by the network, and thus this case is treated as a packet access failure.

Figure 8:
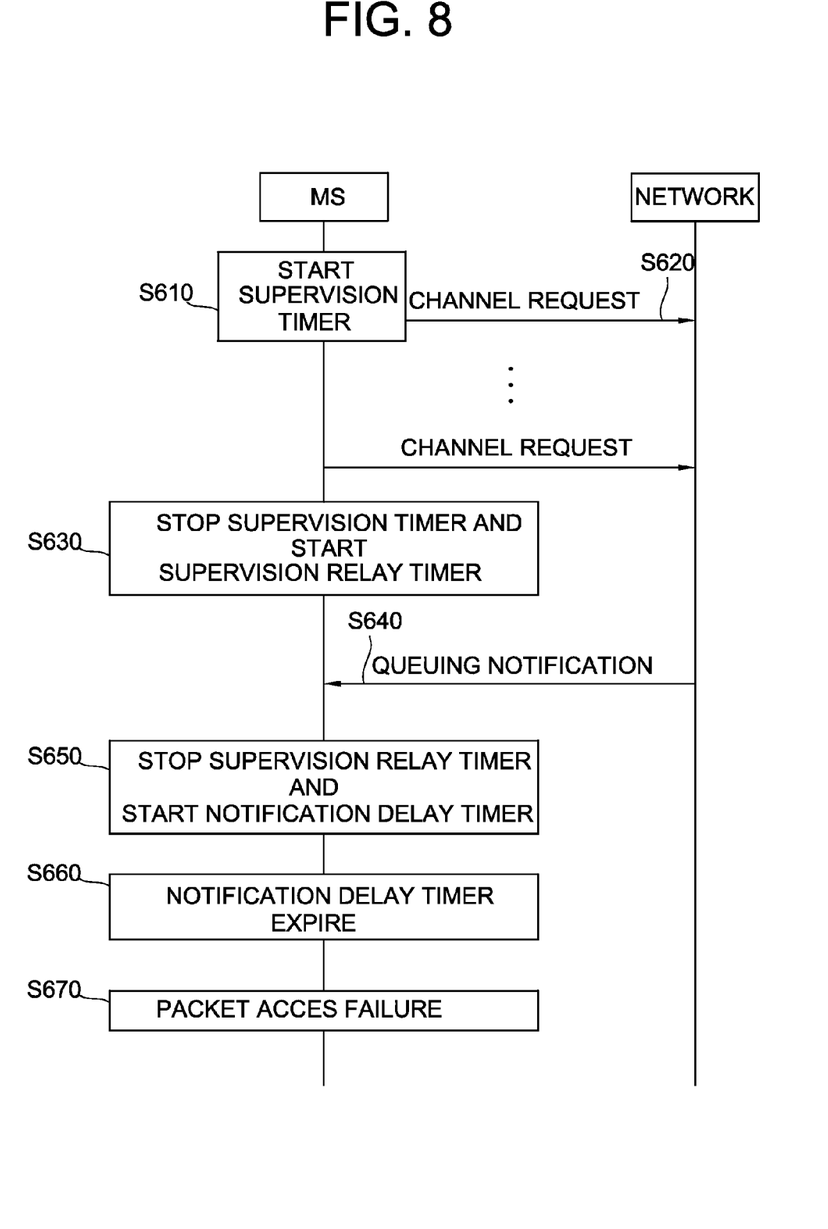
FIG. 8 is a flowchart illustrating a packet access process according to still another embodiment of the invention.

FIG. 8 is a flowchart illustrating a packet access procedure according to another embodiment of the invention.

Referring to FIG. 8, a MS starts a supervision timer at the time of initiating the packet access procedure (S610). The MS initiates the packet access procedure by scheduling the sending of a packet channel request message through a packet random access channel (PRACH) (S620). The packet channel request message can be repeatedly transmitted M+1 times.

When the packet channel request message is repeatedly transmitted M+1 times, the supervision timer is stopped and a supervision relay timer is started (S630).

A network can transmit a packet queuing notification message in response to the channel request message from the MS after the supervision relay timer (S640).

When the packet queuing notification message is received from the network, the supervision relay timer is stopped and a notification delay timer is started (S650).

When the packet uplink assignment message is not received from the network until a predetermined time passes, the notification delay timer expires (S660).

When the notification delay timer expires, the MS notifies the upper layer of a packet access failure and returns to a packet idle mode or a MAC idle state (S660).

If the packet queuing notification message is received after the supervision relay timer is started, it means that the request for radio resources is explicitly rejected by the network. Accordingly, this case is treated as a packet access failure.

The failure of the respective timers which can occur in the course of the packet access procedure is separately treated as the random access failure and the packet access failure. Therefore, it is possible to enhance the access efficiency corresponding to the uplink radio resource request.

By providing guidance for processing failure during a packet access procedure, it is possible to allow a MS to request readio resources for uplink packet transmission more effectively. Accordingly, it is possible to enhance the connection efficiency in the uplink.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A method of enabling a mobile station (MS) to request radio resources for uplink packet transmission, the method comprising:
    starting a supervision timer at the beginning of a packet access procedure, the packet access procedure initiated by scheduling the sending of a packet channel request message;
    performing autonomous cell re-selection when the supervision timer expires;
    starting a supervision relay timer and stopping the supervision timer after having made M+1 (M>0) attempts to send the packet channel request message before the supervision timer expires; and
    performing the autonomous cell re-selection when the supervision relay timer expires,
    wherein the supervision relay timer is stopped on receipt of a packet uplink assignment message or a packet queuing notification message.

2. The method of claim 1, wherein the packet channel request message is sent through a PRACH (Packet Random Access Channel).

3. The method of claim 1, wherein the MS performs the autonomous cell re-selection by checking cells in descending order of received signal strength.

4. The method of claim 1, wherein a value of M is received from the network.

5. The method of claim 1, further comprising:
    starting the supervision relay timer on receipt of a packet access reject message in response to the packet channel request message; and
    returning to a packet idle mode when the supervision relay timer expires,
    wherein the MS leaves the packet idle mode when initiating the packet access procedure and the supervision relay timer is stopped on receipt of a packet uplink assignment message or a packet queuing notification message.

6. The method of claim 1, further comprising:
    starting a notification delay timer on receipt of a packet queuing notification message in response to the packet channel request message; and
    returning to a packet idle mode when the notification delay timer expires, wherein the MS leaves the packet idle mode when initiating the packet access procedure and the notification delay timer is stopped on receipt of a packet uplink assignment message.

7. A mobile station (MS) in a general packet radio service (GPRS) system, the MS comprising:

a transceiver configured to transmit a packet channel request message to request radio resources for uplink packet transmission;

a supervision timer configured to supervise the request of radio resources, wherein the supervision timer is started by transmitting the packet channel request message and the supervision timer is stopped after M+1 (M>0) attempt to send the packet channel request message;

a supervision relay timer configured to start after making M+1 attempts to send the packet channel request message and to stop on receipt of a packet uplink assignment message or a packet queuing notification message; and a controller configured to perform autonomous cell re-selection when the supervision timer or the supervision relay timer expires.

8. The MS of claim 7, further comprising a notification delay timer configured to start on receipt of a packet queuing notification message in response to the packet channel request message, wherein the notification delay timer is stopped on receipt of a packet uplink assignment message.

* * * * *